US007977003B2

United States Patent
Nagoshi et al.

(10) Patent No.: US 7,977,003 B2
(45) Date of Patent: Jul. 12, 2011

(54) FUEL CELL

(75) Inventors: Kentaro Nagoshi, Utsunomiya (JP);
Daisuke Okonogi, Shioya-gun (JP);
Masaru Oda, Utsunomiya (JP);
Narutoshi Sugita, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1242 days.

(21) Appl. No.: 11/254,323

(22) Filed: Oct. 20, 2005

(65) Prior Publication Data
US 2006/0083977 A1    Apr. 20, 2006

(30) Foreign Application Priority Data

Oct. 20, 2004   (JP) ................................. 2004-305151

(51) Int. Cl.
*H01M 2/08* (2006.01)
(52) U.S. Cl. ........ 429/460; 429/457; 429/507; 429/508; 429/514
(58) Field of Classification Search .................... 429/12, 429/34, 35
See application file for complete search history.

(56) References Cited

U.S. PATENT DOCUMENTS

| 4,225,654 A | * | 9/1980 | Tajima et al. ................... 429/34 |
| 6,692,860 B2 | | 2/2004 | Inoue et al. |
| 2004/0023090 A1 | * | 2/2004 | Pearson et al. ................... 429/30 |
| 2004/0121215 A1 | | 6/2004 | Fujii et al. |

FOREIGN PATENT DOCUMENTS

| JP | 2002-25587 | 1/2002 |
| JP | 2003-157867 | 5/2003 |
| JP | 2004-103255 | 4/2004 |
| JP | 2005-071955 | 3/2005 |

OTHER PUBLICATIONS

Japanese Office Action for Application No. 2004-305151, dated Jul. 14, 2009.

* cited by examiner

*Primary Examiner* — Ula C Ruddock
*Assistant Examiner* — Tony Chuo
(74) *Attorney, Agent, or Firm* — Nelson Mullins Riley & Scarborough LLP; Anthony A. Laurentano

(57) ABSTRACT

A power generation cell includes an anode side seal member and a cathode side seal member. The anode side seal member is provided outside an anode of a membrane electrode assembly, and directly contacts a solid polymer electrolyte membrane. The cathode side seal member is provided outside the membrane electrode assembly. A space is formed between the anode side seal member and the cathode side seal member. First ribs are formed integrally with the anode side seal member. The first ribs protrude toward the space. Further, second ribs are formed integrally with the cathode side seal member. The second ribs protrude toward the space. The first ribs and the second ribs are arranged alternately.

4 Claims, 8 Drawing Sheets

FUEL CELL

BACKGROUND OF THE INVENTION

1. Field of the Invention

The present invention relates to a fuel cell comprising a membrane electrode assembly and first and second separators sandwiching the membrane electrode assembly. The membrane electrode assembly includes a first electrode and a second electrode, and an electrolyte membrane interposed between the first electrode and the second electrode. The surface area of the second electrode is larger than the surface area of the first electrode.

2. Description of the Related Art

For example, a solid polymer fuel cell employs a membrane electrode assembly (MEA) which includes an anode, a cathode, and an electrolyte membrane interposed between the anode and the cathode. The electrolyte membrane is a polymer ion exchange membrane. The membrane electrode assembly and separators sandwiching the membrane electrode assembly make up a unit of a power generation cell for generating electricity. In use, a predetermined number of power generation cells are stacked together to form a fuel cell stack.

In the fuel cell, a fuel gas such as a gas chiefly containing hydrogen (hereinafter also referred to as the "hydrogen-containing gas") is supplied to the anode. A gas chiefly containing oxygen or air (hereinafter also referred to as the "oxygen-containing gas") is supplied to the cathode. The catalyst of the anode induces a chemical reaction of the fuel gas to split the hydrogen molecule into hydrogen ions and electrons. The hydrogen ions move toward the cathode through the electrolyte membrane, and the electrons flow through an external circuit to the cathode, creating a DC electrical energy.

In the power generation cell, in order to prevent the leakage of the fuel gas and the oxygen-containing gas by providing hermetical fluid passages, various sealing structures are adopted. For example, Japanese Laid-Open Patent Publication No. 2002-25587 discloses a fuel cell in which it is possible to improve the sealing performance between a membrane electrode assembly and separators.

In the fuel cell, as shown in FIG. 8, a power generation cell is formed by sandwiching a membrane electrode assembly 1 between first and second separators 2a, 2b. The membrane electrode assembly 1 includes an anode 4a, a cathode 4b, and a solid polymer electrolyte membrane 3 interposed between the anode 4a and the cathode 4b. The surface area of the anode 4a is larger than the surface area of the cathode 4b.

A first seal 5a is attached to an inner surface of the second separator 2b. The first seal 5a is provided around the cathode 4b, and tightly contacts the solid polymer electrolyte membrane 3. Further, a second seal 5b is provided between the first and second separators 2a, 2b. The second seal 5b is provided around the first seal 5a.

In the conventional technique, a reactant gas leaks through a space formed between the first and second seals 5a, 5b. The reactant gas may not flow through a reactant gas flow field (not shown), and may pass through the region around the anode 4a, and a so-called short cut may occur undesirably. In this case, the reactant gas is not reliably supplied to the electrode reactant surface. Thus, the desired power generation performance cannot be achieved.

SUMMARY OF THE INVENTION

A main object of the present invention is to provide a fuel cell having a simple structure in which it is possible to reliably prevent the leakage of a reactant gas, while maintaining the desired power generation performance.

The present invention relates to a fuel cell comprising a membrane electrode assembly and first and second separators sandwiching said membrane electrode assembly. The membrane electrode assembly includes a first electrode and a second electrode, and an electrolyte membrane interposed between the first electrode and the second electrode. The surface area of the second electrode is larger than the surface area of the first electrode.

The first separator has a first seal member provided outside the first electrode such that the first seal member contacts the membrane electrode assembly. The second separator has a second seal member provided outside the membrane electrode assembly such that the second seal member contacts the first separator. First ribs are formed integrally with the first seal member and second ribs are formed integrally with the second seal member such that the first ribs and the second ribs are arranged alternately.

Further, it is preferable that third ribs are formed integrally with the first seal member or the second seal member, and the third ribs face the second ribs or the first ribs. Thus, the space between the first seal member and the second seal member is minimized, and it is possible to reliably prevent the shortcut of the reactant gas even more reliably.

According to the present invention, the first ribs are formed integrally with the first seal member, and the second ribs are formed integrally with the second seal member. The first ribs and the second ribs are arranged in a zigzag pattern. Thus, it is possible to prevent the shortcut of the reactant gas through the space between the first and second seal members. Accordingly, the amount of the reactant gas which is not used in the power generation is reduced effectively. With the simple structure, the power generation is reliably performed economically and efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
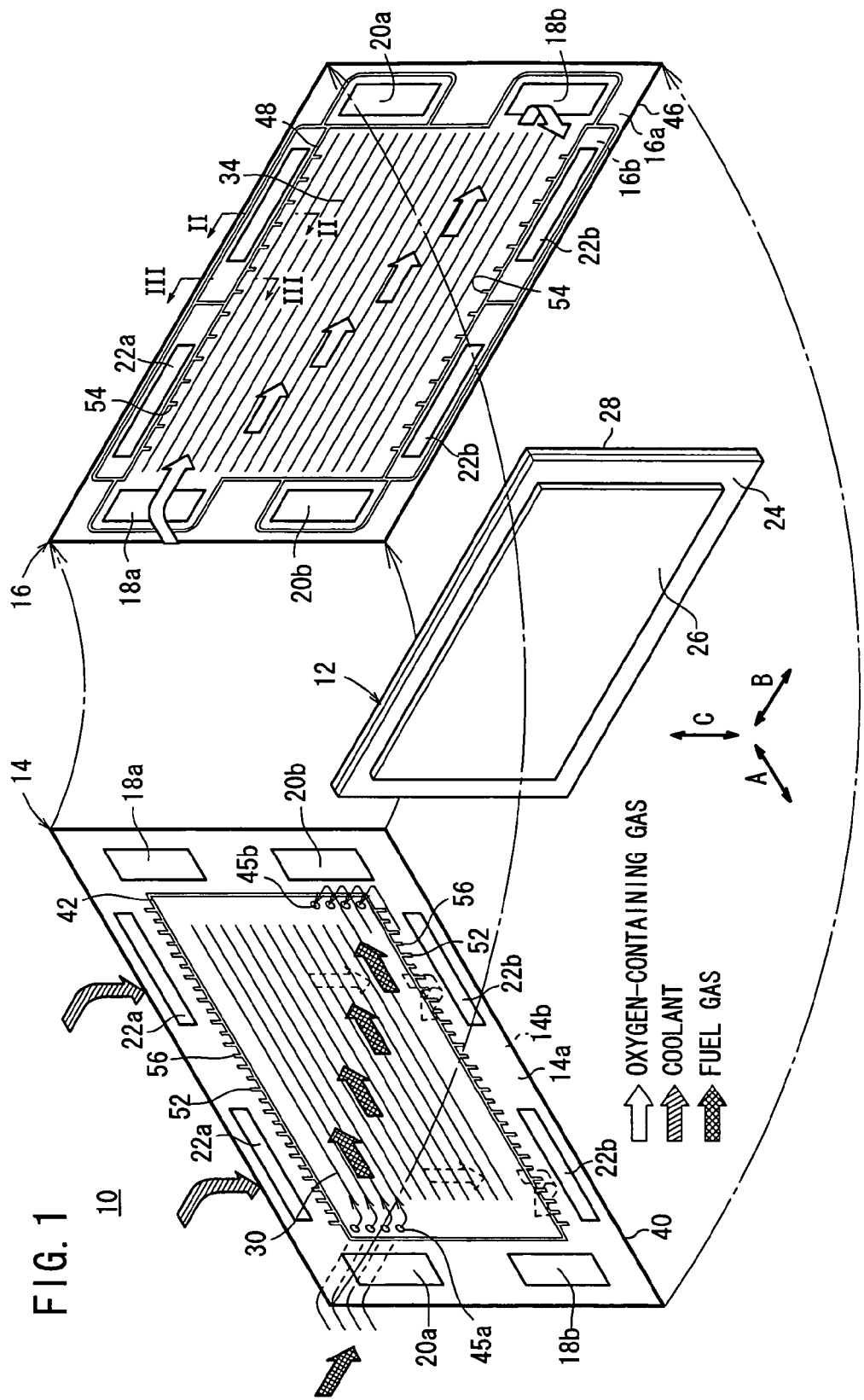
FIG. 1 is an exploded perspective view showing main components of a power generation cell of a fuel cell according to a first embodiment of the present invention.
Figure 2:
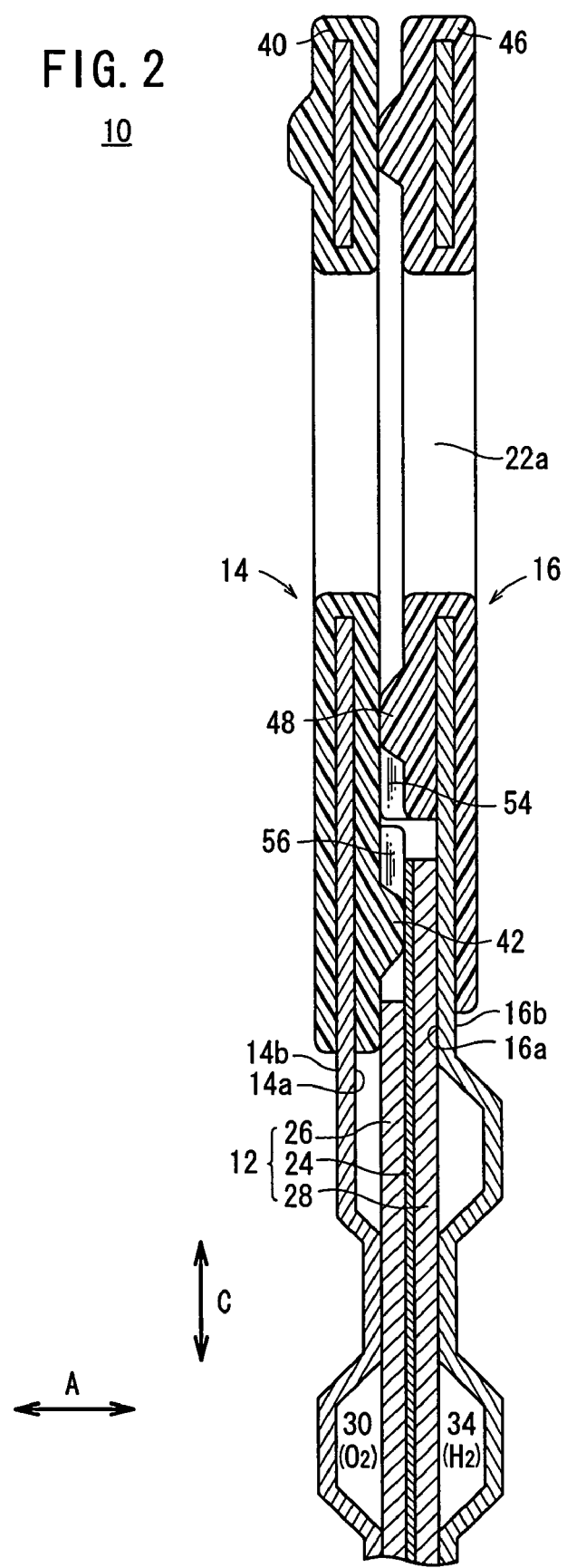
FIG. 2 is a cross sectional view showing the power generation cell, taken along a line II-II in FIG. 1.
Figure 3:
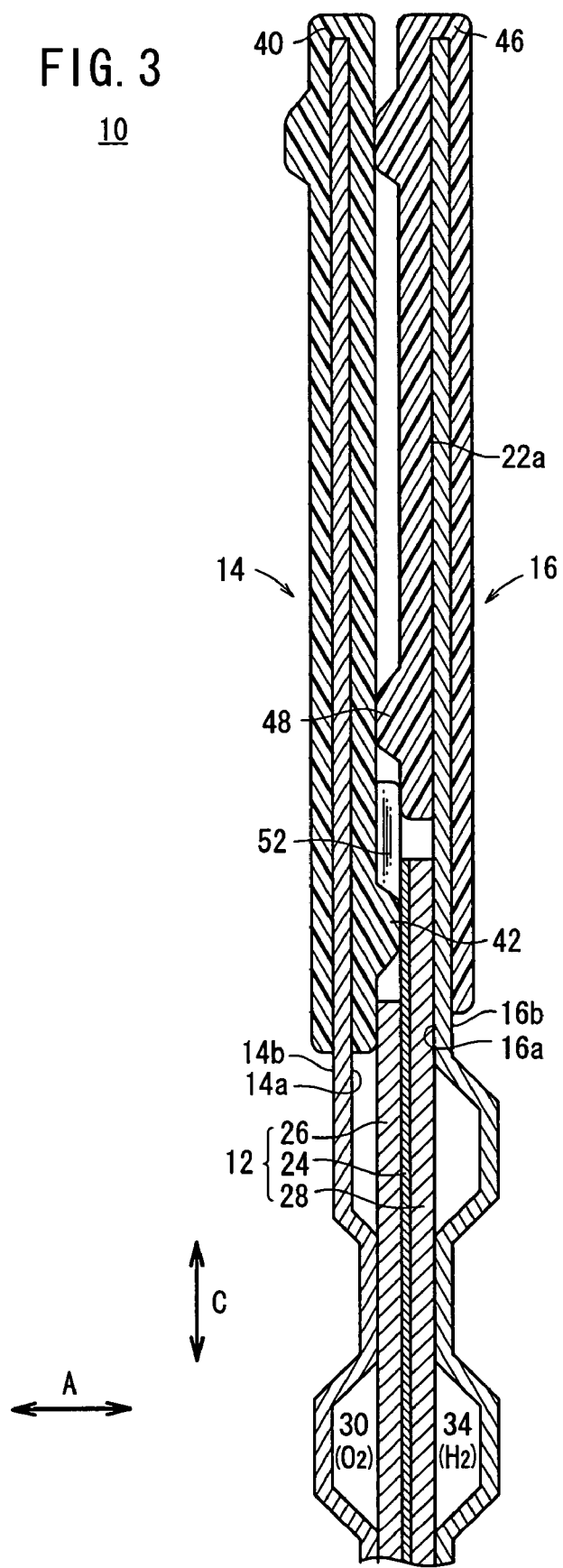
FIG. 3 is a cross sectional view showing the power generation cell, taken along a line III-III in FIG. 1.

FIG. 1 is an exploded perspective view showing main components of a power generation cell 10 of a fuel cell according to a first embodiment of the present invention. FIG. 2 is a cross sectional view showing the power generation cell 10, taken along a line II-II in FIG. 1. FIG. 3 is a cross sectional view showing the power generation cell 10, taken along a line III-III in FIG. 1.

As shown in FIG. 1, the power generation cell 10 includes a membrane electrode assembly 12, and an anode side metal separator (first separator) 14 and a cathode side metal separator (second separator) 16 sandwiching the membrane electrode assembly 12. For example, the anode side metal separator 14 and the cathode side metal separator 16 are steel plates, stainless steel plates, aluminum plates, plated steel sheets, or metal plates having surfaces subjected to anti-corrosive treatment.

At one end of the power generation cell 10 in a longitudinal direction indicated by an arrow B in FIG. 1, an oxygen-containing gas supply passage 18a for supplying an oxygen-containing gas, and a fuel gas discharge passage 20b for discharging a fuel gas such as a hydrogen containing gas are provided. The oxygen-containing supply passage 18a and the fuel gas discharge passage 20b extend through the power generation cell 10 in the direction indicated by an arrow A.

At the other end of the power generation cell 10 in the longitudinal direction, a fuel gas supply passage 20a for supplying the fuel gas and an oxygen-containing gas discharge passage 18b for discharging the oxygen-containing gas are provided. The fuel gas supply passage 20a and the oxygen-containing gas discharge passage 18b extend through the power generation cell 10 in the direction indicated by the arrow A.

At an upper end of the power generation cell 10, coolant supply passages 22a for supplying a coolant are provided. Further, at a lower end of the power generation cell 10, coolant discharge passages 22b for discharging the coolant are provided.

The membrane electrode assembly 12 includes an anode (first electrode) 26, a cathode (second electrode) 28, and a solid polymer electrolyte membrane 24 interposed between the anode 26 and the cathode 28. The solid polymer electrolyte membrane 24 is formed by impregnating a thin membrane of perfluorosulfonic acid with water, for example. The surface area of the anode 26 is smaller than the surface area of the cathode 28 (see FIGS. 1 to 3).

Each of the anode 26 and the cathode 28 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 26 and the electrode catalyst layer of the cathode 28 are formed on both surfaces of the solid polymer electrolyte membrane 24, respectively.

The anode side metal separator 14 has a fuel gas flow field 30 on its surface 14a facing the membrane electrode assembly 12. The fuel gas flow field 30 is connected between the fuel gas supply passage 20a and the fuel gas discharge passage 20b. For example, the fuel gas flow field 30 comprises a plurality of grooves extending in the direction indicated by the arrow B.

Figure 4:
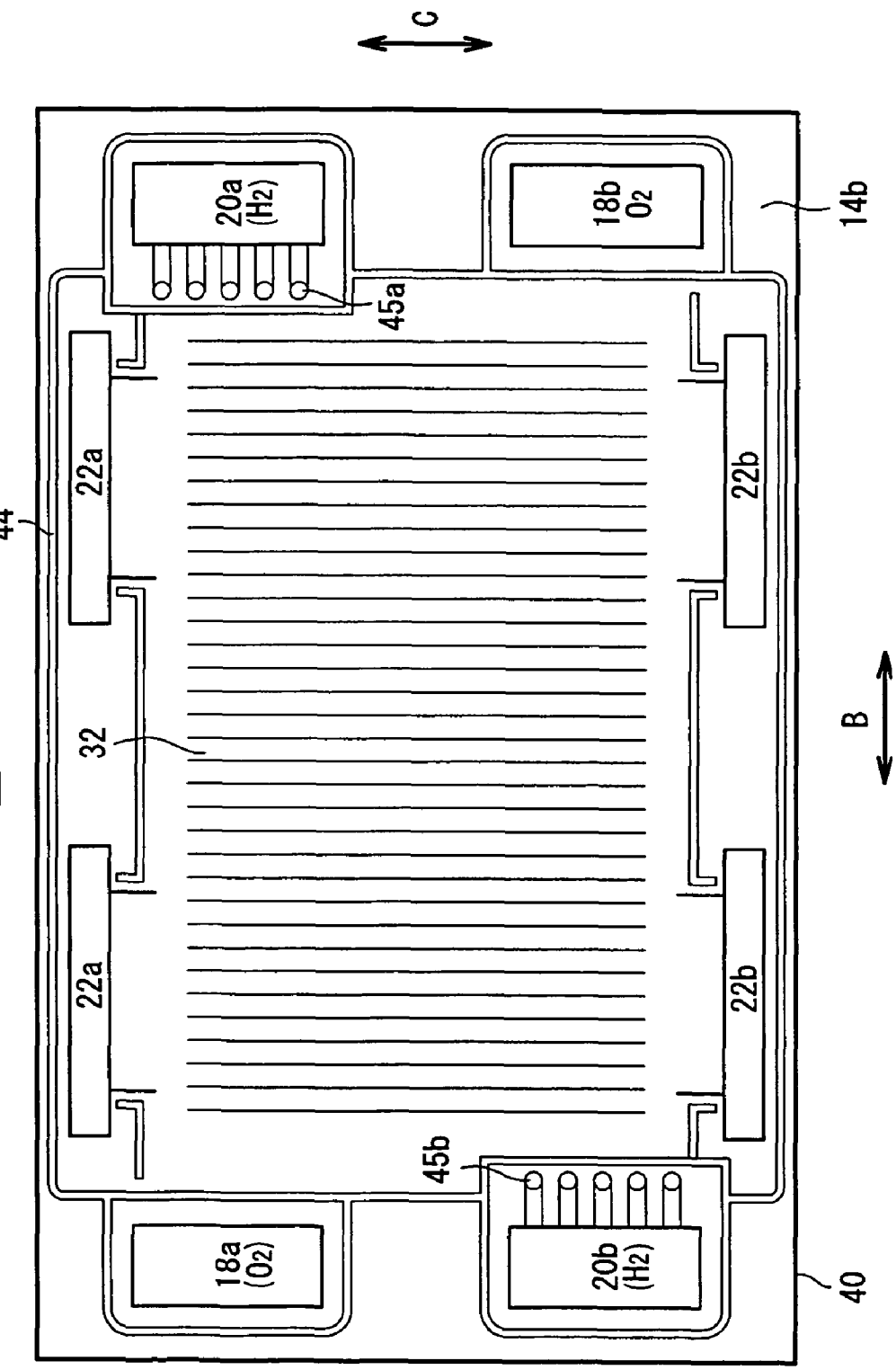
FIG. 4 is a front view showing an anode side metal separator of the power generation cell.

As shown in FIG. 4, the anode side metal separator 14 has a coolant flow field 32 on a surface 14b. The coolant flow field 32 is connected between the coolant supply passages 22a and the coolant discharge passages 22b. The coolant flow field 32 comprises a plurality of grooves extending in the direction indicated by an arrow C.

As shown in FIG. 1, the cathode side metal separator 16 has an oxygen-containing gas flow field 34 on its surface 16a facing the membrane electrode assembly 12. The oxygen-containing gas flow field 34 comprises a plurality of grooves extending in the direction indicated by the arrow B. The oxygen-containing gas flow field 34 is connected between the oxygen-containing gas supply passage 18a and the oxygen-containing gas discharge passage 18b.

As shown in FIGS. 1 and 4, a first resilient seal 40 is formed integrally on the surfaces 14a, 14b of the anode side metal separator 14 to cover (sandwich) the outer end portion of the anode side metal separator 14. The first resilient seal 40 is made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

The first resilient seal 40 includes an anode side seal member (first seal member) 42 formed integrally on the surface 14a of the anode side metal separator 14 and a coolant side seal member 44 formed integrally on the surface 14b of the anode side metal separator 14. Various shapes such as a tapered end shape, a trapezoidal shape, and a semi-cylindrical shape can be adopted as the cross sectional shapes of the anode side seal member 42 and the coolant side seal member 44. A plurality of supply holes 45a and a plurality of discharge holes 45b extend through the anode side metal separator 14 at positions near the fuel gas supply passage 20a and the fuel gas discharge passage 20b, respectively.

Figure 5:
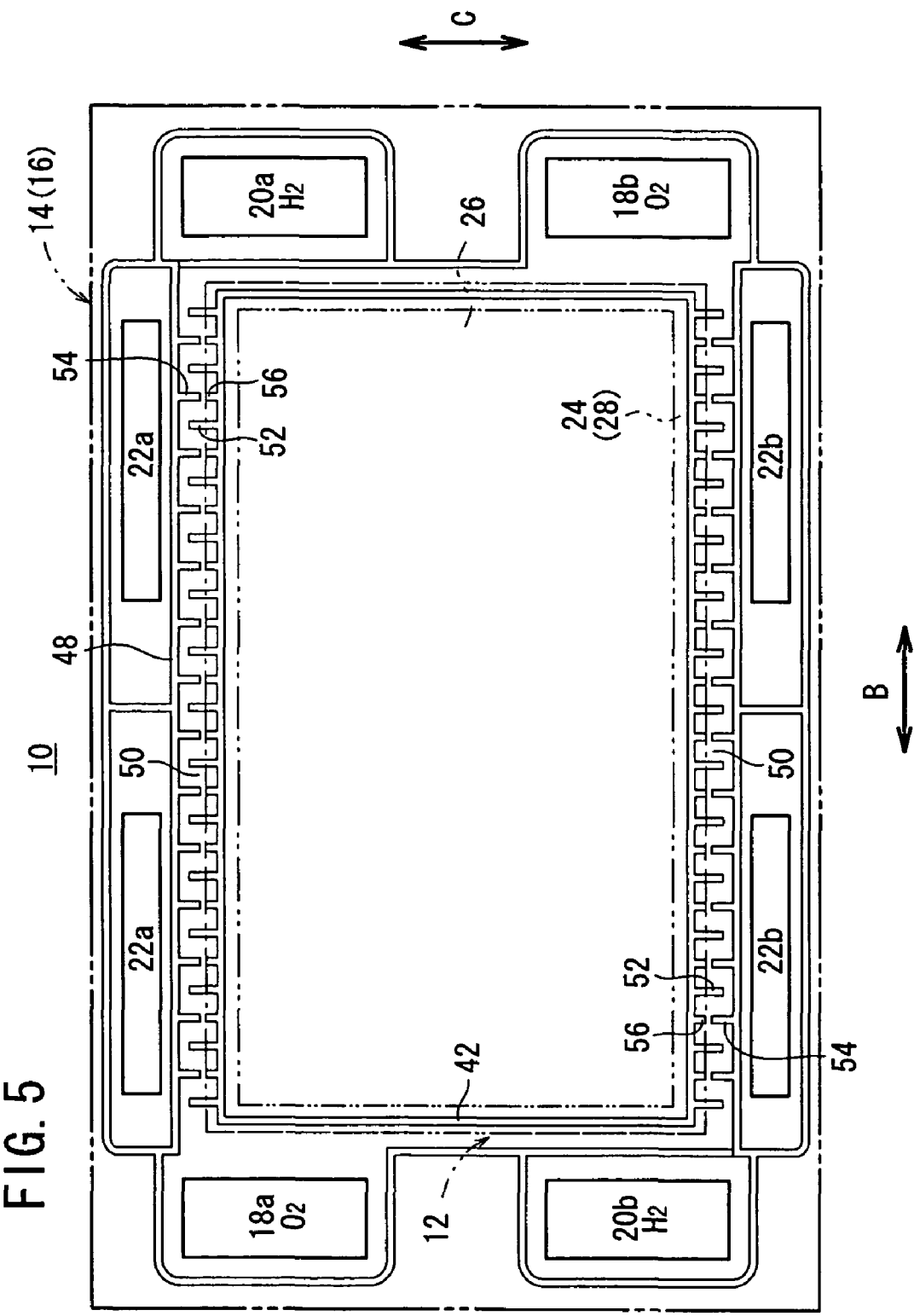
FIG. 5 is a view showing the anode side seal member and a cathode side seal member of the power generation cell.

As shown in FIGS. 2, 3, and 5, the anode side seal member 42 is provided outside the anode 26 of the membrane electrode assembly 12, and directly contacts the solid polymer electrolyte membrane 24. As shown in FIG. 4, the coolant side seal member 44 prevents the leakage of the coolant from the coolant flow field 32 to the oxygen-containing gas supply passage 18a, the fuel gas discharge passage 20b, the fuel gas supply passage 20a and the oxygen-containing gas discharge passage 18b, while allowing the coolant to flow from the coolant supply passages 22a to the coolant flow field 32, and flow from the coolant flow field 32 to the coolant discharge passages 22b.

As shown in FIG. 1, a second resilient seal 46 is formed integrally on the surfaces 16a, 16b of the cathode side metal separator 16 to cover (sandwich) the outer end portion of the cathode side metal separator 16. The second resilient seal 46 includes a cathode side seal member (second seal member) 48 formed integrally on the surface 16a of the cathode side metal separator 16. The structure of the cathode side seal member 48 is the same as the structure of the anode side seal member 42.

As shown in FIGS. 1 to 3, the cathode side seal member 48 is provided outside the membrane electrode assembly 12, and contacts the surface 14a of the anode side metal separator 14 through the first resilient seal 40. The cathode side seal member 48 prevents the leakage of the oxygen-containing gas while allowing the oxygen-containing gas to flow from the oxygen-containing gas supply passage 18a to the oxygen-containing gas flow field 34, and to flow from the oxygen-containing gas flow field 34 to the oxygen-containing gas discharge passage 18b.

As shown in FIG. 5, in the power generation cell 10, when the membrane electrode assembly 12 is sandwiched between the anode side metal separator 14 and the cathode side metal separator 16, a space 50 connecting the oxygen-containing gas supply passage 18a and the oxygen-containing gas discharge passage 18b is formed between the anode side seal member 42 and the cathode side seal member 48.

A plurality of first ribs 52 are formed integrally with the anode side seal member 42. The first ribs 52 protrude toward the cathode side seal member 48 to positions where the first ribs 52 do not interfere with the cathode side seal member 48 (see FIGS. 3 and 5). Front ends of the first ribs 52 are overlapped with the second resilient seal 46 (see FIG. 3). A plurality of second ribs 54 are formed integrally with the cathode side seal member 48. The second ribs 54 extend toward the anode side seal member 42 to positions where the second ribs 54 do not interfere with the outer end portion of the membrane electrode assembly 12 (see FIGS. 2 and 5).

Specifically, in practice, it is necessary to provide spaces for preventing the cathode side seal member 48 from being tilted down by the first ribs 52 or preventing the second ribs 54 from being tilted down by the membrane electrode assembly 12 due to the compression tolerance or assembling tolerance. That is, in order to prevent the interferences, the first ribs 52 protrude toward the cathode side seal member 48 such that the space is formed between the first ribs 52 and the cathode side seal member 48, and the second ribs 54 extend toward the anode side seal member 42 such that the space is formed between the second ribs 54 and the anode side seal member 42.

The first ribs 52 and the second ribs 54 are arranged alternately in a zigzag pattern. A plurality of third ribs 56 are formed integrally with the anode side seal member 42. The third ribs 56 face the second ribs 54, and protrude toward the second ribs 54 (see FIGS. 2 and 5).

Next, operation of the power generation cell 10 will be described below.

Firstly, as shown in FIG. 1, an oxygen-containing gas is supplied to the oxygen-containing gas supply passage 18a, and a fuel gas such as a hydrogen-containing gas is supplied to the fuel gas supply passage 20a. Further, a coolant such as pure water, an ethylene glycol or an oil is supplied to the coolant supply passages 22a.

Thus, the oxygen-containing gas flows from the oxygen-containing gas supply passage 18a into the oxygen-containing gas flow field 34 of the cathode side metal separator 16. The oxygen-containing gas flows in the direction indicated by the arrow B along the cathode 28 of the membrane electrode assembly 12 for inducing an electrochemical reaction at the cathode 28. The fuel gas flows from the fuel gas supply passage 20a to the fuel gas flow field 30 of the anode side metal separator 14 through the supply holes 45a. The fuel gas flows through the fuel gas flow field 30 in the direction indicated by the arrow B along the anode 26 of the membrane electrode assembly 12 for inducing an electrochemical reaction at the anode 26.

Thus, in each of the membrane electrode assemblies 12, the oxygen-containing gas supplied to the cathode 28, and the fuel gas supplied to the anode 26 are consumed in the electrochemical reactions at catalyst layers of the cathode 28 and the anode 26 for generating electricity.

The oxygen-containing gas consumed at the cathode 28 is discharged into the oxygen-containing gas discharge passage 18b, and flows in the direction indicated by the arrow A. Likewise, the fuel gas consumed at the anode 26 is discharged through the discharge holes 45b into the fuel gas discharge passage 20b, and flows in the direction indicated by the arrow A.

The coolant supplied to the coolant supply passages 22a flows into the coolant flow field 32 of the anode side metal separator 14, and flows in the direction indicated by the arrow C (see FIG. 4). After the coolant is used for cooling the membrane electrode assembly 12, the coolant is discharged into the coolant discharge passages 22b (see FIG. 1).

In the first embodiment, as shown FIGS. 2, 3 and 5, the anode side seal member 42 and the cathode side seal member 48 are provided. The anode side seal member 42 directly contacts the solid polymer electrolyte membrane 24 of the membrane electrode assembly 12. The cathode side seal member 48 is provided outside the membrane electrode assembly 12, and contacts the surface 14a of the anode side metal separator 14 through the first resilient seal 40. The first ribs 52 and the second ribs 54 are formed integrally with the anode side seal member 42 and the cathode side seal member 48, and arranged in a zigzag pattern.

That is, the first ribs 52 and the second ribs 54 protrude toward the space 50 between the anode side seal member 42 and the cathode side seal member 48 in a zigzag pattern. Therefore, it is possible to effectively prevent the shortcut of the reactant gas such as the oxygen-containing gas or the fuel gas through the space 50. As a result, the amount of the reactant gas which is not used in the power generation is reduced effectively. With the simple structure, the power generation is reliably performed economically and efficiently.

Further, in the first embodiment, the third ribs 56 are formed integrally with the anode side seal member 42. The third ribs 56 face the second ribs 54 of the cathode side seal member 48. Thus, the space between the second and the third ribs 54, 56 is minimized, and the shortcut of the reactant gas is prevented even more reliably.

In the first embodiment, the anode side seal member 42 has the first and third ribs 52, 56, and the cathode side seal member 48 has the second ribs 54. However, the present invention is not limited in this respect. Alternatively, the cathode side seal member 48 may have the first and third ribs 52, 56, and the anode side seal member 42 may have the second ribs 54.

Figure 6:
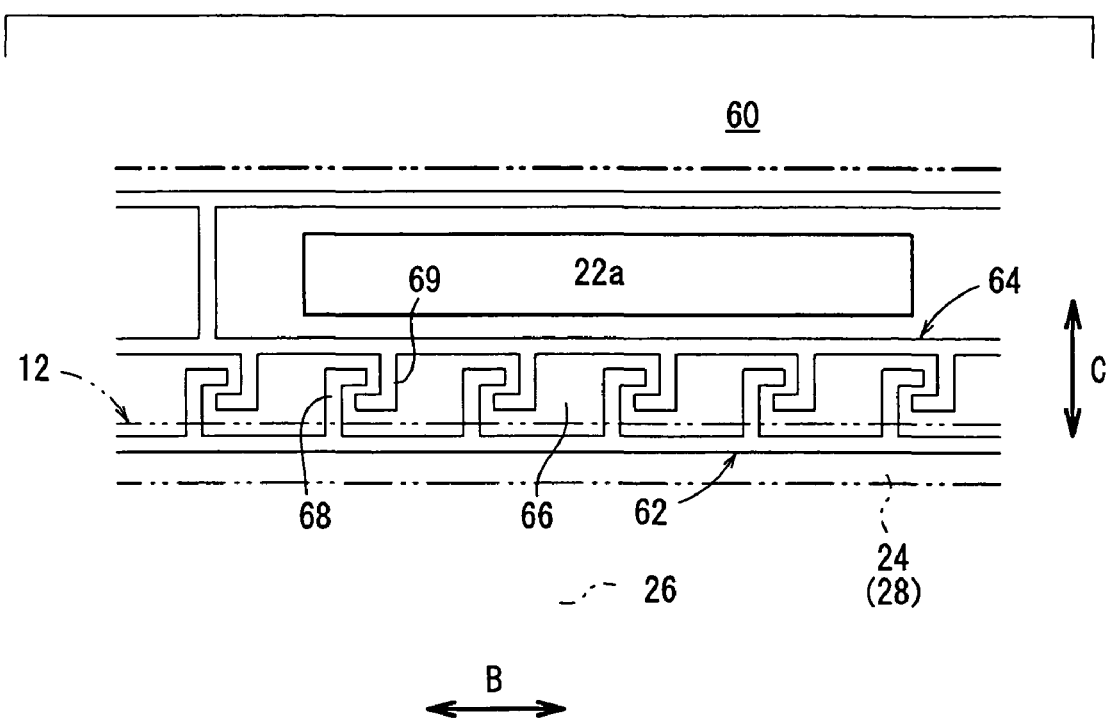
FIG. 6 is an enlarged view showing main components of a power generation cell of a fuel cell according to a second embodiment of the present invention.

FIG. 6 is an enlarged view showing main components of a power generation cell 60 of a fuel cell according to a second embodiment of the present invention. The constituent elements that are identical to those of the power generation cell 10 according to the first embodiment are labeled with the same reference numeral, and description thereof will be omitted. Likewise, in a third embodiment as described later, The constituent elements that are identical to those of the power generation cell 10 according to the first embodiment are labeled with the same reference numeral, and description thereof will be omitted.

The power generation cell 60 includes an anode side seal member (first seal member) 62 and a cathode side seal member (second seal member) 64. A space 66 is provided between the anode side seal member 62 and the cathode side seal member 64. A plurality of first ribs 68 are formed integrally with the anode side seal member 62. The first ribs 68 are curved in a substantially L-shape, and protrude toward the space 66. Further, a plurality of second ribs 69 are formed integrally with the cathode side seal member 64. The second ribs 69 are curved in a substantially L-shape, and protrude toward the space 66. The front ends of the first ribs 68 and the front ends of the second ribs 69 extend toward each other to form partitions curved complicatedly like a maze.

In the second embodiment, partitions curved complicatedly are used in the space 66. Thus, the same advantages as with the first embodiment can be obtained. For example, it is possible to reliably prevent the shortcut of the reactant gas through the space 66.

Figure 7:
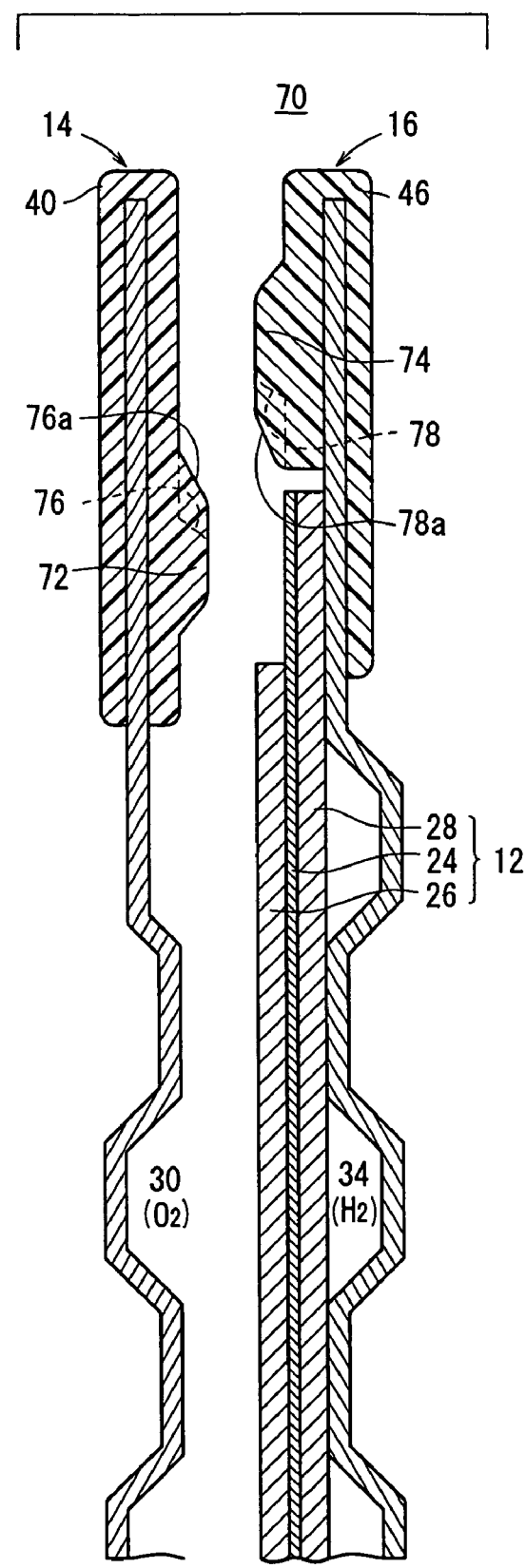
FIG. 7 is an exploded cross sectional view showing main components of a power generation cell of a fuel cell according to a third embodiment of the present invention.
Figure 8:
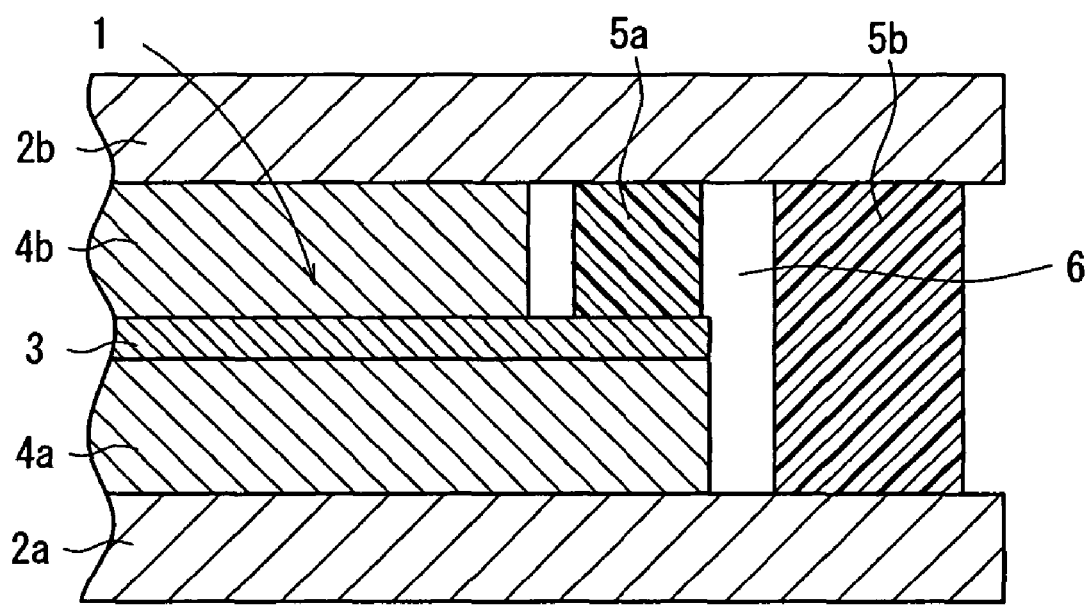
FIG. 8 is a view showing a seal structure disclosed in Japanese Laid-Open Patent Publication No. 2002-25587.

FIG. 7 is an exploded cross sectional view showing main components of a power generation cell 70 of a fuel cell according to the third embodiment of the present invention.

The power generation cell 70 includes an anode side seal member 72 and a cathode side seal member 74. The first ribs 76 are formed integrally with the anode side seal member 72, and the second ribs 78 are formed integrally with the cathode side seal member 74. The first ribs 76 and the second ribs 78 face each other, and partly contact at their tapered surfaces 76*a*, 76*b*.

Thus, in the third embodiment, when the power generation cell 70 is assembled by sandwiching the membrane electrode assembly 12 between the anode side metal separator 14 and the cathode side metal separator 16, the first ribs 76 and the second ribs 78 and partly contact at their tapered surfaces 76*a*, 76*b*. Therefore, it is possible to reliably prevent the shortcut of the reactant gas. Further, no excessive contact force is applied to the anode side seal member 72 and the cathode side seal member 74. Thus, it is possible to desirably prevent the deformation or generation of the unnecessary stress.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a membrane electrode assembly and first and second separators sandwiching said membrane electrode assembly, said membrane electrode assembly including a first electrode and a second electrode, and an electrolyte membrane interposed between said first electrode and said second electrode, the surface area of said second electrode being larger than the surface area of said first electrode, wherein
    said first separator has a first seal member provided outside said first electrode such that said first seal member contacts said membrane electrode assembly;
    said second separator has a second seal member provided outside said membrane electrode assembly such that said second seal member contacts said first separator;
    first ribs are formed integrally with said first seal member, and second ribs are formed integrally with said second seal member such that said first ribs and said second ribs are arranged alternately along a surface of the separator across the length of the separator in a direction in which the seal member extends such that a lengthwise space exists between each first rib and each second rib;
    the first ribs extend outwardly from the first seal member toward the second seal member, and the second ribs extend inwardly from the second seal member that is different than the first seal member toward the first seal member; and
    the first ribs are provided on the first separator and contact the membrane electrode assembly, and the second ribs are provided on the second separator and contact the first separator.

2. A fuel cell according to claim 1, wherein third ribs are formed integrally with said first seal member or said second seal member, and said third ribs face said second ribs or said first ribs.

3. A fuel cell according to claim 1, wherein a first resilient seal covers an outer end portion of said first separator, and said first seal member is formed integrally with said first resilient seal; and
    a second resilient seal covers an outer end portion of said second separator and said second seal member is formed integrally with said second resilient seal; and
    front ends of said first ribs of said first seal member are overlapped with said second resilient seal.

4. A fuel cell according to claim 1, wherein said first ribs and said second ribs are curved in a substantially L-shape, and front ends of said first ribs and said second ribs extend toward each other.

* * * * *